(12) United States Patent
Aoki et al.

(10) Patent No.: US 10,983,516 B2
(45) Date of Patent: Apr. 20, 2021

(54) VEHICLE CONTROL SYSTEM

(71) Applicant: TOYOTA JIDOSHA KABUSHIKI KAISHA, Toyota (JP)

(72) Inventors: Kenichiro Aoki, Miyoshi (JP); Akira Ito, Nukata-gun (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 110 days.

(21) Appl. No.: 16/211,862

(22) Filed: Dec. 6, 2018

(65) Prior Publication Data
US 2019/0227544 A1 Jul. 25, 2019

(30) Foreign Application Priority Data

Jan. 25, 2018 (JP) .............................. JP2018-010918

(51) Int. Cl.
| | |
|---|---|
| *G05D 1/00* | (2006.01) |
| *B60W 40/04* | (2006.01) |
| *B60W 50/08* | (2020.01) |
| *B60W 10/18* | (2012.01) |
| *B60W 30/18* | (2012.01) |
| *B60W 10/20* | (2006.01) |

(52) U.S. Cl.
CPC ........... *G05D 1/0061* (2013.01); *B60W 10/18* (2013.01); *B60W 10/20* (2013.01); *B60W 30/18163* (2013.01); *B60W 40/04* (2013.01); *B60W 50/082* (2013.01); *G05D 1/0088* (2013.01); *B60W 2554/00* (2020.02); *B60W 2710/18* (2013.01); *B60W 2710/20* (2013.01); *G05D 2201/0213* (2013.01)

(58) Field of Classification Search
CPC ............... G05D 1/0061; G05D 1/0088; G05D 2201/0213; B60W 50/082; B60W 40/04; B60W 10/18; B60W 30/18163; B60W 10/20; B60W 2554/00; B60W 2710/18; B60W 2710/20; B60W 60/0053; B60W 60/0011; B60W 50/10; B60W 50/14; B60W 10/04; B60W 30/10; B60W 30/182
See application file for complete search history.

(56) References Cited

U.S. PATENT DOCUMENTS

| | | | |
|---|---|---|---|
| 2017/0313321 A1* | 11/2017 | Asakura | G01C 21/3469 |
| 2018/0099676 A1* | 4/2018 | Goto | B60W 30/09 |
| 2018/0229743 A1 | 8/2018 | Aoi | |
| 2019/0228375 A1* | 7/2019 | Laury | G05D 1/0088 |

FOREIGN PATENT DOCUMENTS

| | | |
|---|---|---|
| JP | 2016-071514 A | 5/2016 |
| JP | 2017-97519 A | 6/2017 |
| WO | 2017/047261 A1 | 3/2017 |

* cited by examiner

*Primary Examiner* — Peter D Nolan
*Assistant Examiner* — Ashley L Redhead, Jr.
(74) *Attorney, Agent, or Firm* — Sughrue Mion, PLLC

(57) ABSTRACT

When generating a traveling path for divergent event, a traveling path generation portion judges an occurrence of a traffic jam on a divergent lane. The occurrence of the traffic jam on the divergent lane is judged based on whether or not a surrounding vehicle which satisfies a predetermined condition exist in a search region. If it is judged that the traffic jam is occurring on the divergent lane, a notice for handover from an automatic divergent operation to a manual divergent operation is given to a driver.

3 Claims, 8 Drawing Sheets

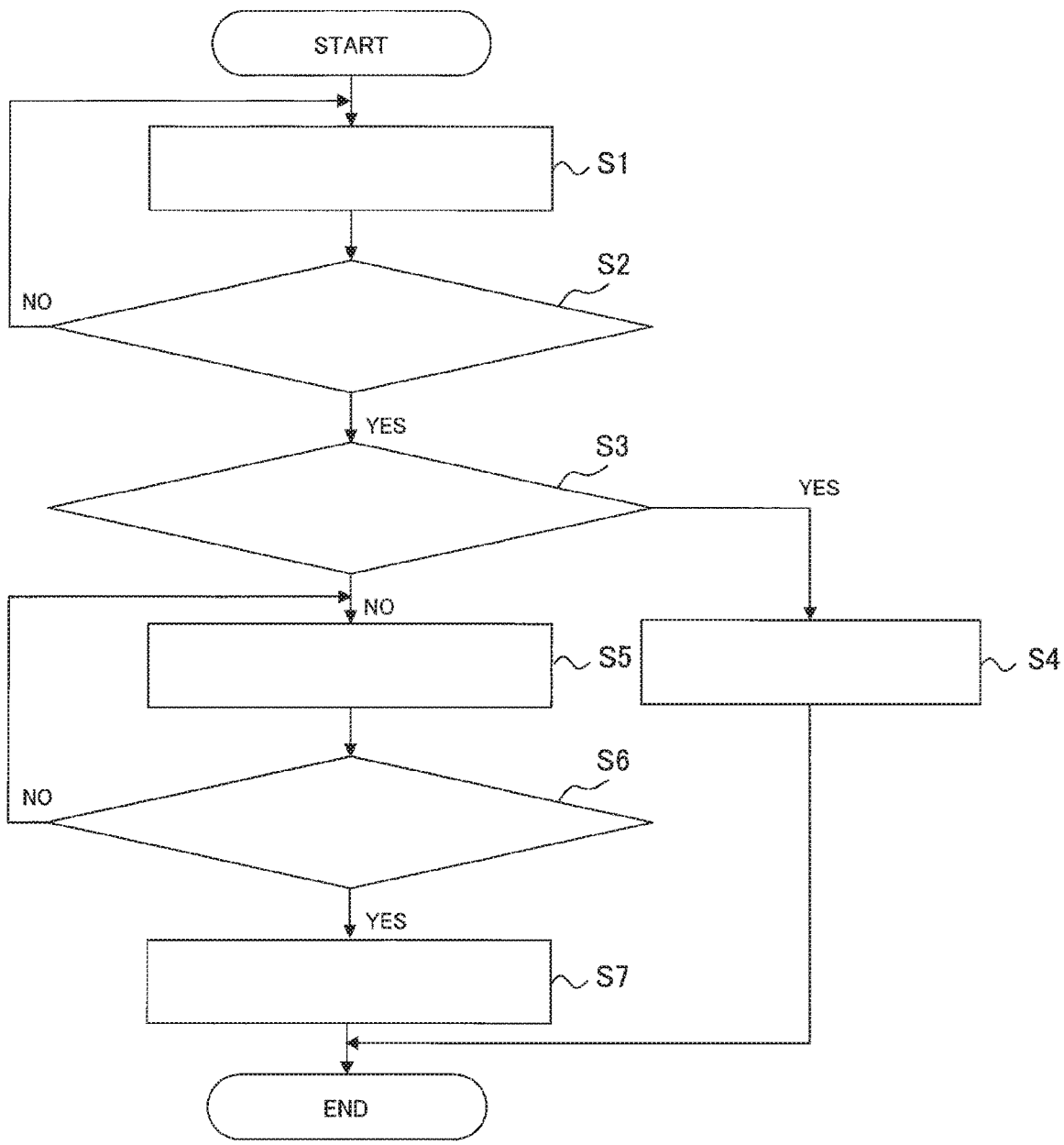

S1 PROCESSING BASED ON TRAVELING PATH FOR LANE KEEP EVENT
S2 DOES SUBJECT VEHICLE PASS POINT 120 METERS BEFORE BEGINNING OF DIVERGENT LANE?
S3 DOES TRAFFIC JAM OCCUR ON DIVERGENT LANE?
S4 NOTICE FOR HANDOVER
S5 PROCESSING BASED ON TRAVELING PATH FOR DIVERGENT EVENT
S6 HAS SUBJECT VEHICLE TRAVELED HALF OF DIVERGENT LANE?
S7 PROCESSING BASED ON TRAVELING PATH FOR LANE KEEP EVENT

FIG. 9

S7 HAS HANDOVER OF DIVERGENT OPERATION BEEN COMPLETED?
S8 HAS SUBJECT VEHICLE PASSED BEGINNING OF DIVERGENT LANE?
S10 PROCESSING BASED ON TRAVELING PATH FOR LANE KEEP EVENT

VEHICLE CONTROL SYSTEM

CROSS-REFERENCE TO RELATED APPLICATION

The present disclosure claims priority under 35 U.S.C. § 119 to Japanese Patent Applications No. 2018-010918, filed on Jan. 25, 2018. The contents of these applications are incorporated herein by reference in their entirety.

TECHNICAL FIELD

The present disclosure relates to a vehicle control system.

BACKGROUND

JP 2016-71514 A discloses a travel support controller which is configured to execute automatic driving control of a vehicle. The controller is configured to, as a part of the automatic driving control, receive an approval from a driver of the vehicle before the execution of automatic lane change.

The automatic lane change is realized, for example, by continuing to execute lane keep control during the lane change while switching a traveling path from a lane along which the vehicle travels to a destination lane at the lane change while. Such the automatic lane change operation is also applied to automatic divergent operation. In this case, the lane along which the vehicle travels is substituted with a main lane and the destination lane is substituted with a divergent lane. However, when a traffic jam occurs on the divergent lane, there may be a case where other vehicles on this divergent are recognized later than usual. Then, the vehicle may be required to decelerate rapidly immediately after the recognition of the other vehicles. Therefore, it is desirable to develop a technology for ensuring safety during the automatic divergent operation.

The present disclosure addresses the above described problem, and an object of the present disclosure is, to provide a technology capable of ensuring safety during the automatic divergent operation.

SUMMARY

A first aspect of the present disclosure is a vehicle control system for solving the problem described above and has the following features.

The vehicle control system includes a controller.
The controller is configured to:
recognize actual location of a subject vehicle;
recognize a surrounding landmark of the subject vehicle;
generate an action plan of a predetermined route along which an automatic driving is executed;
generate a traveling path based on the action plan, the actual location and the surrounding landmark, wherein the traveling path is a collection of target positions to which the subject vehicle should arrive in future; and
control, based on the traveling path at least driving force for travel output device, a steering device and a brake device of the subject vehicle;
wherein, when automatic divergent operation between a main lane and a divergent lane is executed, the controller is further configured to:
before switching current traveling path for the main lane to the traveling path for the divergent lane, judge whether a traffic jam occurs on a first or a second region, wherein the first region is a region which includes a first breakdown lane around the divergent lane and the second region is a region which includes a second breakdown lane around the main lane to which the first breakdown lane connects;
when it is judged that the traffic jam occurs on the first or second region, give a notice for handover from the automatic divergent operation to manual divergent operation to a driver of the subject vehicle.

A second aspect of the present disclosure has the following features according to the first aspect.

The controller is further configured to:
judge whether there is a response from the driver against the notice for handover; and
when it is judged that there is no response against the notice for handover, continue to execute the automatic driving based on the current traveling path for the main lane instead of executing the automatic divergent operation based on the traveling path for the divergent lane.

A third aspect of the present disclosure has the following features according to the first aspect.

The controller is further configured to:
judge that the traffic jam occurs on the first region when there is a vehicle on the first region which travels along the same travel direction as the subject vehicle; and
judge that the traffic jam occurs on the second region when there is a vehicle on the second region which travels along the same travel direction as the subject vehicle and also a predetermined inter-vehicular distance condition of the vehicle on the second region is satisfied.

According to the first aspect, it is judged before the switch to the traveling path for the divergent lane the traffic jam occurs on the first or second region. And when it is judged that the traffic jam occurs on the first or second region, the notice for handover from the automatic divergent operation to the manual divergent operation is given to the driver. Therefore, it is possible to ensure safety during automatic divergent operation.

According to the second aspect, when there is no response against the notice for handover, the automatic driving based on the current traveling path for the main land is continued to execute instead of executing the automatic divergent operation based on the traveling path for the divergent lane. Therefore, it is possible to avoid an occurrence of a forceful automatic divergent operation or a gridlock of the subject vehicle near a divergent point.

According to the third aspect, it is possible to execute the notice for handover from the automatic divergent operation to the manual divergent operation by recognizing the traffic jam on the divergent lane or the traffic jam extending from the divergent lane to the main lane.

BRIEF DESCRIPTION OF DRAWINGS

FIG. 9 is a flowchart for illustrating an example of a program executed by the vehicle control ECU in the first embodiment;

DESCRIPTION OF EMBODIMENT

Figure 1:
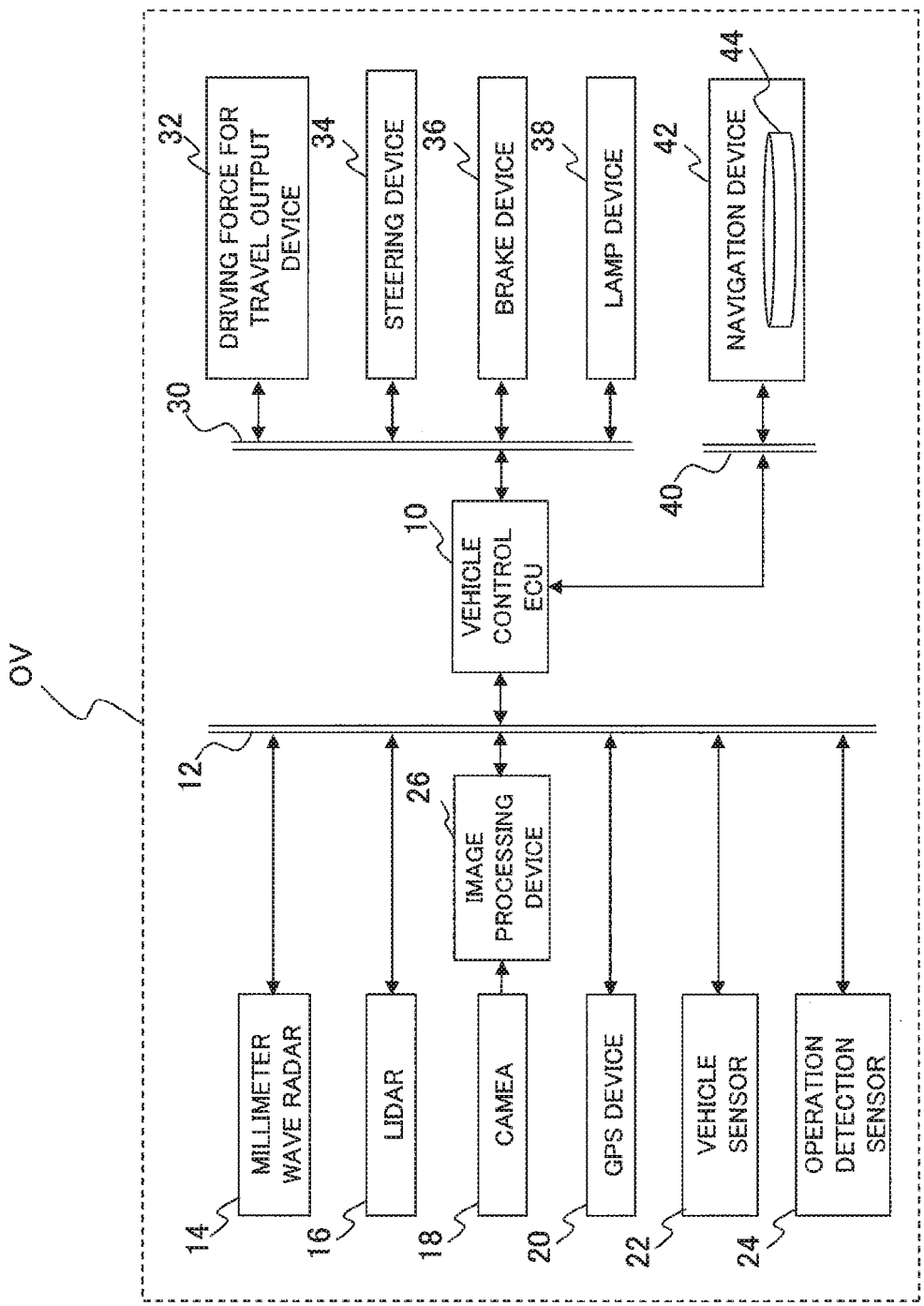
FIG. 1 is a block diagram for showing an overall configuration of a vehicle control system according to a first embodiment of the present disclosure.

Hereinafter, embodiments of the present disclosure will be described based on the accompanying drawings. Note that elements that are common to the respective drawings are denoted by the same reference characters and a duplicate description thereof is omitted. Further, the present disclosure is not limited to the embodiments described hereinafter.

First Embodiment

A first embodiment of the present disclosure will be described with reference to FIGS. 1 to 8.
1. Overall Configuration of Vehicle Control System FIG. 1 is a block diagram for showing an overall configuration of a vehicle control system according to the first embodiment. A vehicle equipped with the present system (hereinafter also referred to as a "subject vehicle OV") is powered by an internal combustion engine such as a diesel engine and a gasoline engine, an electronic vehicle which is powered by an electric motor, or a hybrid vehicle which is powered by an internal combustion engine or an electric motor. The motor is driven by a battery such as a secondary battery, a hydrogen fuel cell, a metal fuel cell and an alcohol fuel cell.

The vehicle control system includes a plurality of electronic control units (i.e., controllers mainly composed of a computer, hereinafter also referred to as "ECUs"). A main control unit among the ECUs is a vehicle control ECU 10. The vehicle control ECU 10 is connected to a sensor system LAN 12 as well as other LANs in the subject vehicle OV. A variety of sensor devices are connected to the LAN 12. The vehicle control ECU 10 controls these sensor devices. In addition, the vehicle control ECU 10 obtains from these sensor devices information on surroundings of the subject vehicle OV, information on behavior of the subject vehicle OV and information on operation amount by a driver of the subject vehicle OV.
1.2 Description of Sensor System The vehicle control system includes, as these sensor devices, a millimeter wave radar 14, a LIDAR (Laser Imaging Detection and Ranging) 16, a camera 18, a GPS (Global Positioning System) device 20, a vehicle sensor 22 and an operation detection sensor 24.

The millimeter wave radar 14 detects a landmark by launching a millimeter wave (i.e., an example of an electromagnetic wave) around the subject vehicle OV and receiving a reflective wave reflected by the landmark. According to the millimeter wave radar 14, not only a distance between the subject vehicle OV and the landmark but also speed of the landmark relative to the subject vehicle OV (i.e., relative speed of the landmark) are estimated. According to the millimeter wave radar 14, it is also possible to estimate bearing orientation of the landmark relative to the subject vehicle (i.e., relative bearing of the landmark) based on a direction from which the reflective wave flies to the subject vehicle OV. The distance between the subject vehicle OV and the landmark and the relative bearing of the landmark are classified as positional information on the landmark. The millimeter wave radar 14 transmits the positional information and the relative speed the vehicle control ECU 10 as landmark information.

The LIDAR 16 detects the landmark by irradiating a laser emitting pulsed around the subject vehicle OV and receiving a reflected laser light from the landmark. Likewise the millimeter wave radar 14, according to the LIDAR 16, it is possible to estimate the distance between the subject vehicle OV and the landmark and the relative bearing of the landmark. In other words, according to the LIDER 16, it is possible to obtain the positional information on landmark. In addition, according to the LIDER 16, it is possible to detect an outer shape of the landmark (e.g., height and width). The LIDAR 16 transmits the positional information (i.e., the distance and the relative bearing) and outer shape information on the landmark to the vehicle control ECU 10 as landmark information.

The camera 18 is a device to image an external situation of the subject vehicle OV. The camera 18 is, for example, a digital camera using a solid-state imaging device such as a CCD (Charge Coupled Device) or a CMOS (Complementary Metal Oxide Semiconductor). The camera 18 is provided, for example, on a back side of a windshield of the subject vehicle OV. The camera 18 may be a monocular camera or a stereo camera. The stereo camera has, for example, two imaging portions arranged to reproduce binocular parallax. Image information on the stereo camera includes information on a depth direction.

The camera 18 transmits the image information on the external situation of the subject vehicle OV to an image processing device 26. The image processing device 26 executes image processing based on the image information. In the image processing, rough position of the landmark is grasped based on the landmark information from the millimeter wave radar 14. In the image processing, a part moving integrally within a visual field of the camera 18 is recognized as an image of the landmark with reference to the grasped rough position of the landmark. It should be noted that specific processing of the recognition processing is not particularly limited, and it is sufficient to obey known processing. The image processing device 26 transmits information on outer shape of the recognized landmark to the vehicle control ECU 10.

The GPS device 20 receives signals from three or more GPS Satellites. Based on the received signal, the GPS device 20 measures a current location of the subject vehicle OV (e.g., latitude and longitude of the subject vehicle OV). The GPS device 20 transmits information on the current location of the measured subject vehicle OV to the travel assist ECU 10.

The vehicle sensor 22 is a sensor for obtaining the information on behavior of the subject vehicle OV. The vehicle sensor 22 includes a speed sensor, an acceleration sensor, a yaw rate sensor and an orientation sensor. The speed sensor detects speed of the subject vehicle OV. The acceleration sensor detects acceleration of the subject vehicle OV. The yaw rate sensor detects angular velocity around a vertical axis of the subject vehicle OV. The orientation sensor detects orientation of the subject vehicle OV. The vehicle sensor 22 transmits the detected information to the vehicle control ECU 10.

The operation detection sensor 24 is a sensor for obtaining information on the operation amount by the driver of the subject vehicle OV. The operation amount includes information on presence or absence of the operation. The operation detection sensor 24 includes an accelerator position sensor, a steering torque sensor, a brake sensor and a shift position sensor. The accelerator position sensor detects depression amount of an accelerator pedal. The steering torque sensor detects rotation angle of a steering wheel. The brake sensor detects depression amount of a brake pedal. The shift position sensor detects state of a gear. The operation detection sensor 24 transmits the detected information to the vehicle control ECU 10. It should be noted that the detected information may be transmitted directly to a driving force for travel output device 32, a steering device 34, a brake device 36 and a lamp device 38.

1.3 Description of Control System

The vehicle control ECU 10 is also connected to a control system LAN 30. Various devices are connected to this LAN 30. These devices are electronically controlled. Each ECU (not shown) of these devices and the vehicle control ECU 10 are connected via the LAN 30. The present system includes, as these devices, the driving force for travel output device 32, the steering device 34, the brake device 36 and the lamp device 38.

When the subject vehicle OV is a vehicle powered by the internal combustion engine, the driving force for travel output device 32 includes an engine and an engine ECU which controls the engine. When the subject vehicle OV is an electronic vehicle powered by the electric motor, the driving force for travel output device 32 includes a motor for traveling and a motor ECU that controls the motor for traveling. When the subject vehicle OV is a hybrid vehicle, the driving force for travel output device 32 includes the engine, the engine ECU, the motor for traveling and the motor ECU.

When the subject vehicle OV includes the internal combustion engine as the power source, the engine ECU adjusts throttle opening degree of the engine and gear shift stage according to information from a traveling control portion 110 described later. Also, the engine ECU outputs driving force (i.e., torque). When the subject vehicle OV uses the electric motor as the power source, the motor ECU adjusts duty ratio of a PWM signal which is transmitted to the motor for traveling according to the information from the traveling control portion 110. Also, the motor ECU outputs the driving force. When the subject vehicle OV is the hybrid vehicle, the engine ECU and the motor ECU cooperate with each other to control the driving force according to the information from the traveling control portion 110.

The steering device 34 includes, for example, an electric motor. The electric motor, for example, changes direction of turning angle by applying force to a rack and pinion mechanism. The steering device 34 drives the electric motor and changes the direction of the turning angle in accordance with the information from the traveling control portion 110.

The brake device 36 is, for example, an electric servo brake device including a brake caliper, a cylinder which transmits hydraulic pressure to the brake caliper, an electric motor which generates hydraulic pressure in the cylinder and a braking control unit. The braking control unit controls the electric motor and outputs brake torque corresponding to a braking operation to each wheel in accordance with the information from the traveling control portion 110. The brake device 36 may be an electronically controlled hydraulic brake device. The brake device 36 may include a regenerative brake with the motor for traveling of the driving force for travel output device 32.

The lamp device 38 includes various lamps mounted on the subject vehicle OV. The lamp device 38 includes, for example, a headlight, a backlight, a blinker lamp and a brake lamp. The lamp device 38 executes a necessary lighting operation and a light-off operation in accordance with the information from the traveling control portion 110.

1.4 Description of AV System

The vehicle control ECU 10 is also connected to an AV System LAN 40. The LAN 40 is a network relating to car navigation information. Various devices are connected to this LAN 40. In this AV system, as one of these devices, a navigation device 42 is provided. The navigation device 42 includes a memory portion 44. The memory portion 44 is realized by an HDD (Hard Disk Drive), a flash memory or the like. In the memory portion 44, map information data is stored. The map information data includes data on positions such as roads, intersections, interflow points and divergent points, data on road shape (e.g., road type such as straight and curve, road width, road gradient and road curvature) and data on road type (e.g., expressway, toll road and national highway).

In addition to the memory portion 44, the navigation device 42 includes a touch panel display functioning as a user interface, a speaker, a microphone, and the like. While the vehicle control ECU 10 executes a manual driving mode, the navigation device 42 executes guidance with by sound and navigation display about a route to a destination. On the touch panel display, a GUI (Graphical User Interface) switch is provided. The GUI switch receives an operation from the driver, generates a signal designating a control mode executed by the traveling control portion 110, and outputs a signal to a control switch portion 112 described later. Note that such a function of the GUI switch may be realized by a mechanical switch installed on the steering wheel or a dashboard.

The vehicle control system has an automatic driving mode and a manual driving mode as the control mode executed by the traveling control portion 110. The automatic driving mode is a control mode in which the subject vehicle OV is controlled to travel in a state in which the driver does not operate (i.e., in a state in which the operation amount of the subject vehicle OV is smaller than that in the manual driving mode, or operation frequency of the subject vehicle OV is low). Specifically, the automatic driving mode is an operation mode in which at least one of the devices 32, 34, 36 and 38 is controlled on the basis of an action plan described later. The manual driving mode is an operation mode in which assist control of at least one of the devices 32, 34, 36 and 38 is executed as required.

2. Description of Vehicle Control ECU 10

Figure 2:
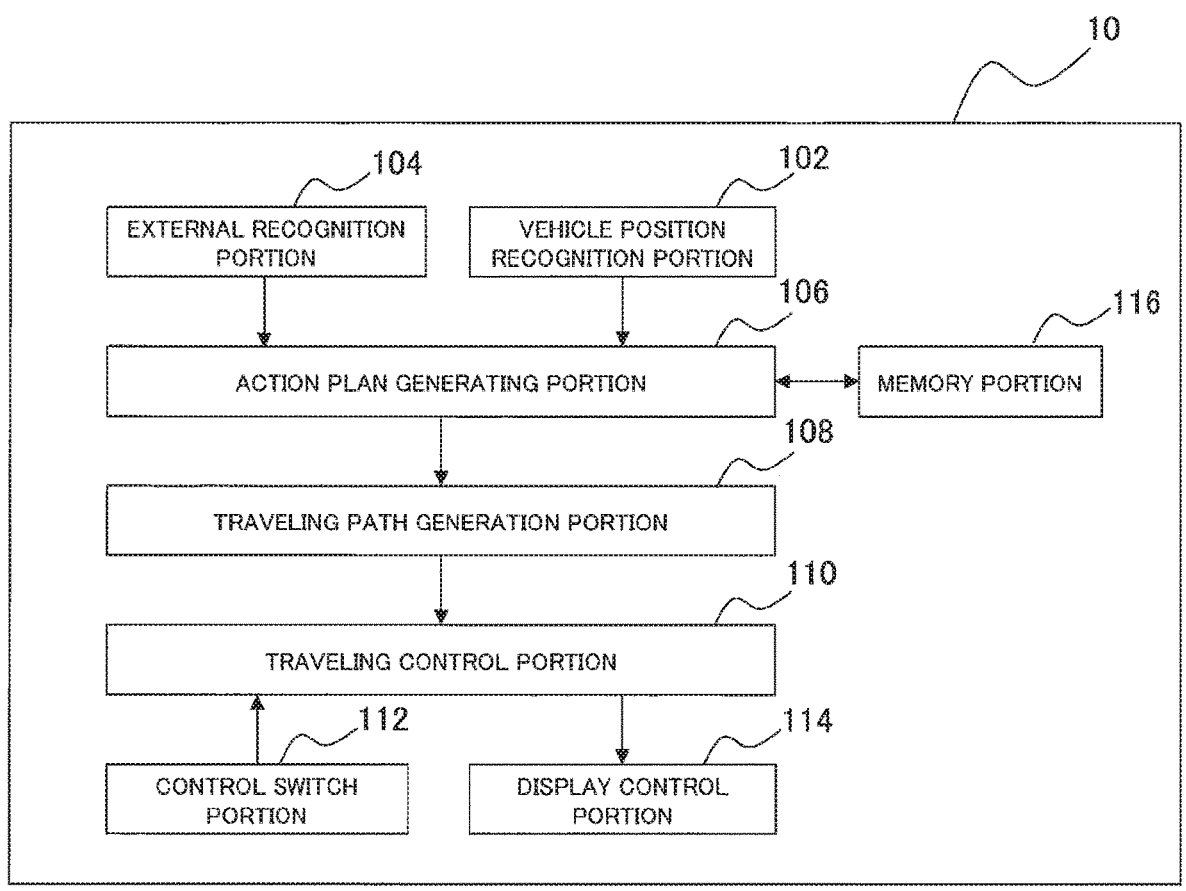
FIG. 2 is a function block diagram of a vehicle control ECU.

FIG. 2 is a block diagram for showing a functional configuration example of the vehicle control ECU 10. The vehicle control ECU 10 includes a vehicle position recognition portion 102, an external recognition portion 104, an action plan generating portion 106, a traveling path generation portion 108, a traveling control portion 110, a control switch portion 112, a display control portion 114 and a memory portion 116. Some or all of these portions 102, 104, 106, 108, 110, 112 and 114 are realized by execution of a program with a processor such as a CPU (Central Processing Unit) included in the vehicle control ECU 10. The memory portion 116 is realized by a ROM (Read Only Memory), a RAM (Random Access Memory), a HDD or a flash memory. The program executed by the processor may be pre-stored in the memory portion 116 or may be downloaded from the Internet.

The portion 102 recognize a lane along which the subject vehicle OV travels (hereinafter also referred to as a "traveling lane") and relative position of the subject vehicle OV to the traveling lane based on the information from the GPS device 20 and the vehicle sensor 22 shown in FIG. 1 and the map information stored in the memory portion 44.

The portion 104 recognizes a location, speed and acceleration of a landmark in the vicinity of the subject vehicle OV based on the information from the millimeter wave radar 14, the LIDER 16 and the image processing device 26. The position of the landmark may be recognized by a representative point such as a center and a corner of the landmark. The position of the landmark may be recognized by a region representing a contour of the landmark. The landmark in the vicinity of the subject vehicle OV includes surrounding vehicles of the subject vehicle OV. The surrounding vehicles are vehicles which travel around the subject vehicle OV and in the same direction as the subject vehicle OV.

The portion 106 sets a start point and a destination of an automatic driving when the automatic driving mode is selected. The start point may be actual location of the subject vehicle OV or an entrance of a section in which the automatic driving mode is preliminarily set (e.g., a section of a highway). The portion 106 also generates an action plan at a predetermined route from the start point to the destination. The action plan is composed of a plurality of events to be executed sequentially. The event includes an acceleration event, a deceleration event, a lane keep event, a lane change event, a divergent event and an interfluent event.

The acceleration event is an event in which the subject vehicle OV is accelerated. The deceleration event is an event in which the subject vehicle OV is decelerated. The lane keep event is an event in which the subject vehicle OV is controlled so as not to deviate from the traveling lane. The lane change event is an event in which the traveling lane is changed between two lanes adjacent to each other. The divergent event is an event in which the traveling lane is changed near a divergent point from a main line to a branch lane. The interfluent event is an event in which the traveling lane is changed near an interfluent point from an interflow lane to the main line.

The portion 106 generates an action plan such that an event suitable for each scene is executed in the predetermined route. For example, if the divergent point is included in the predetermined route, the portion 106 generates next action plan to be executed around the divergent point. The generated action plan includes a lane keep event which is executed on a lane connecting to the divergent lane in front of the divergent point, a divergent event from the main lane to the divergent lane which is executed on the divergent point, and a lane keep event which is executed on the divergent lane in back of the divergent point. Information on the generated action plan is stored in the portion 116 as information on action plan information.

The portion 106 may change or update the generated action plan based on the recognition result by the portion 104. Generally, situation around a vehicle changes constantly while the vehicle travels. For example, when a preceding vehicle (i.e., a surrounding vehicle traveling just before the subject vehicle OV) rapidly decelerates in the traveling lane, it is necessary for the subject vehicle OV to change its speed or the traveling lane in accordance with behavior of the preceding vehicle. The same is true when a surrounding vehicle traveling in the lane adjacent to the traveling lane cuts in front of the subject vehicle OV. In such a case, accordingly, the portion 106 may appropriately change the generated action plan based on the recognition result by the portion 104. Information indicating the changed action plan is stored in the portion 116 in the same manner as the action plan before change.

The traveling path generation portion 108 generates a traveling path based on the action plan generated by the action plan generating portion 106, the recognition result by the vehicle position recognition portion 102, and the recognition result by the external recognition portion 104. A traveling path is a collection of target positions to which the reference position of the subject vehicle OV (for example, the center of the subject vehicle OV or the center of the rear wheel axis) should arrive in the future. The target position is set each time a predetermined time elapses with the current time as a reference.

The traveling path is generated as follows, for example. When generating the traveling path for lane keep event, traveling mode is determined firstly. The traveling mode includes cruise control, following travel and curve travel. The cruise control is a traveling mode which is selected when no surrounding vehicle exist in front of the subject vehicle OV. The following travel is a traveling mode which is selected when the preceding vehicle is present. The curve travel is a traveling mode which is selected when the subject vehicle OV reaches a curve. Subsequently, a start point and a target point of the lane keep event are set based on the determined or selected traveling mode. Subsequently, a smooth traveling path is generated considering the start position, the target position, and constraints on vehicle's motion.

When generating the traveling path for lane change event, it is confirmed that there is no surrounding vehicle interfering with the lane change event around the subject vehicle OV. Herein, the wording "there is no surrounding vehicle interfering with the lane change event" means that there is no surrounding vehicle within a predetermined distance ahead of the subject vehicle OV in the traveling lane and also there is no surrounding vehicle within a predetermined distance in front and rear of the subject vehicle OV in the destination lane at the lane change. After confirming this absence, a start position and a target position of the lane change event are set. Subsequently, a smooth traveling path is generated considering the start position, the target position, and the constraints on vehicle's motion.

When there is a surrounding vehicle interfering with the lane change event, displacement of a future position of the surrounding vehicle is predicted by a predetermined speed model. The predetermined speed model includes a constant acceleration model, a constant acceleration model and a constant jerk model. The constant acceleration model is a model to assume that the surrounding vehicle keeps running at its current speed. The constant acceleration model is a model to assume that the surrounding vehicle keeps running at its current acceleration. The constant jerk model is a model to assume that the surrounding vehicle keeps running at its current jerk. Subsequently, based on the predicted future position and current speed of the subject vehicle OV, a start position and a target position are set such that the subject vehicle OV is able to execute the lane change without interfering with the surrounding vehicle. Subsequently, a smooth traveling path is generated considering the start position, the target position, and the constraints on vehicle's motion.

The method of generating travel paths for divergent or interfluent event is basically the same as that for lane change event. That is, when generating the travel path for divergent event, the original lane at the lane change (i.e., the traveling lane) should be replaced with the main line and the destination lane at the lane change should be replaced with the branch lane. When generating the travel path for interfluent event, the original lane at the lane change should be replaced with the interflow lane and the destination lane at the lane change should be replaced with the main line.

The portion 110 sets the control mode to the automatic driving mode or the manual driving mode by control of the portion 112. The portion 110 also controls some or all of control objects shown in FIG. 1 (i.e., the driving force for travel output device 32, the steering device 34, the brake device 36 and lamp device 38, the same applies to the following) in accordance with the set control mode.

The portion 110 controls the control objects based on the traveling path generated by the portion 108 when the automatic driving mode is selected. For example, when the traveling path for lane keep event is generated, the portion 110 sets control amount of the engine ECU (e.g., throttle opening degree of the engine and shift stage) and control amount of the motor ECU (e.g., revolution number of the motor for traveling). The portion 110 also determines control amount of the electric motor of the steering device 34. The portion 110 appropriately adjusts the determined control amount based on the information detected by the vehicle sensor 22.

The traveling control portion 110 controls the control objects based on the information detected by the operation detection sensor 24 when the manual driving mode is selected. For example, the portion 110 directly outputs the information detected by the operation detection sensor 24 to the control objects.

The portion 112 switches the control mode of the subject vehicle OV executed by the portion 110 based on the information indicating the action plan which was generated by the portion 106 and stored in the portion 116. The portion 112 also switches the control mode of the subject vehicle OV between the automatic driving mode and the manual driving mode based on the signal input from the GUI switch. In other words, the control mode of the portion 110 is arbitrarily switched while the subject vehicle OV is traveling or stopped.

The portion 112 switches the control mode of the subject vehicle OV from the automatic driving mode to the manual driving mode based on the information from the operation detection sensor 24. For example, the portion 112 switches the control mode of subject vehicle OV from automatic driving mode to manual driving mode when operation amount contained in the information exceeds a threshold. For example, when the automatic driving mode is selected and the driver intentionally operates the steering wheel, the operation amount contained in the information may exceed the threshold.

The portion 114 displays attention-seeking message or current status of the automatic driving on a MFD (Multi-Function Display) installed in front of the driver or a predetermined area of the touch panel display based on the information indicating the action plan which was generated by the portion 106 and store in the portion 116. The portion 114 also displays on the MFD or the predetermined area of the touch panel display based on detection information from predetermined sensors among the vehicle sensors and the information from the operation detection sensor 24.

3. Features of Vehicle Control in First Embodiment

Figure 3:
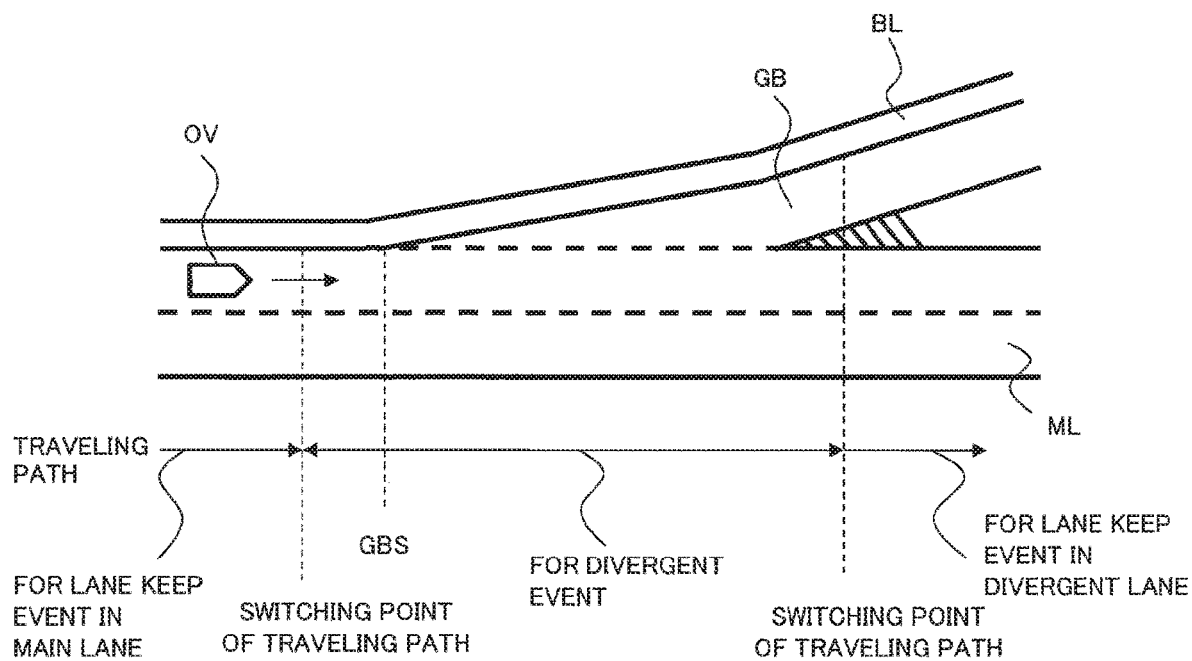
FIG. 3 is diagram for describing an example in which a traveling path is switched near a divergent point.

FIG. 3 is a diagram for describing an example in which a traveling path is switched near a divergent point. As described above, the traveling path is generated based on the action plan. In an example shown in FIG. 3, the action plan is consisted of a lane keep event in a main lane ML in front of the divergent point, a divergent event near the divergent point and a lane keep event in a divergent lane GB in back of the divergent point. Therefore, in this example, the traveling path is switched from that for the lane keep event in the main lane ML to that for the divergent event, and further switched to that for the lane keep event in the divergent lane GB. In FIG. 3, these switching points are drawn. The switching point to the traveling path for divergent event (the switching point shown on the left) is drawn in front of a beginning of a divergent lane BGS. However, the switching point may be set in back of the beginning of divergent lane BGS.

Also, as described above, traveling path for divergent event is generated in the same way as traveling path for lane change event. Therefore, when generating the traveling path for divergent event, it is firstly confirmed that there is no surrounding vehicle interfering with the lane change event around the subject vehicle OV. Specifically, it is confirmed that there is no surrounding vehicle within a predetermined distance ahead of subject vehicle OV in the traveling lane (i.e., the main lane ML) or the destination lane at the lane change (i.e., the divergent lane GB). After confirming this absence, the start position and the target position in the divergent event are set. This start position corresponds to the switching point shown on the left side of FIG. 3. When there is the surrounding vehicle interfering with the divergent event, the start position is set after the prediction based on the predetermined speed model is executed.

Figure 4:
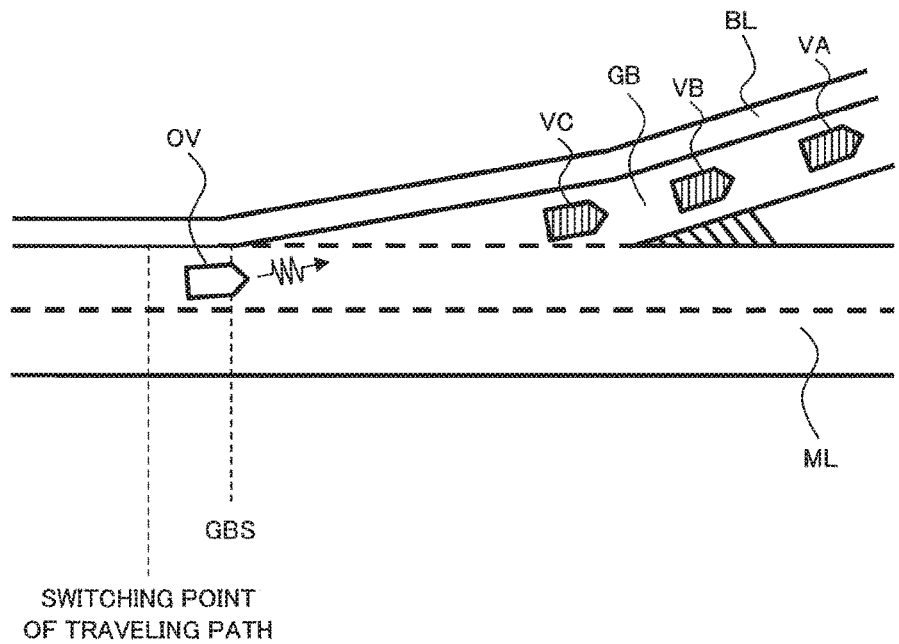
FIG. 4 is a diagram for describing a problem when a traffic jam occurs on a divergent lane.

However, when a traffic jam occurs on the divergent lane GB, such an absence confirmation processing alone is not sufficient. The reason for this is that the relative speed of the vehicle consisting of the traffic jam on the divergent lane GB increases with the speed of the subject vehicle OV in front of the divergent point. When the subject vehicle has not decelerated sufficiently in front of the divergent point, the subject vehicle OV is required to decelerate immediately after recognizing the surrounding vehicle on the divergent lane GB. FIG. 4 is a diagram for describing a problem when such a traffic jam is occurring on the divergent lane GB. In the example shown in FIG. 4, surrounding vehicles VA, VB or VC on the divergent lane GB is recognized immediately after switching to the traveling path for divergent event. In this case, therefore, it is necessary to change the action plan to execute the deceleration event in the middle of the divergent event.

Figure 5:
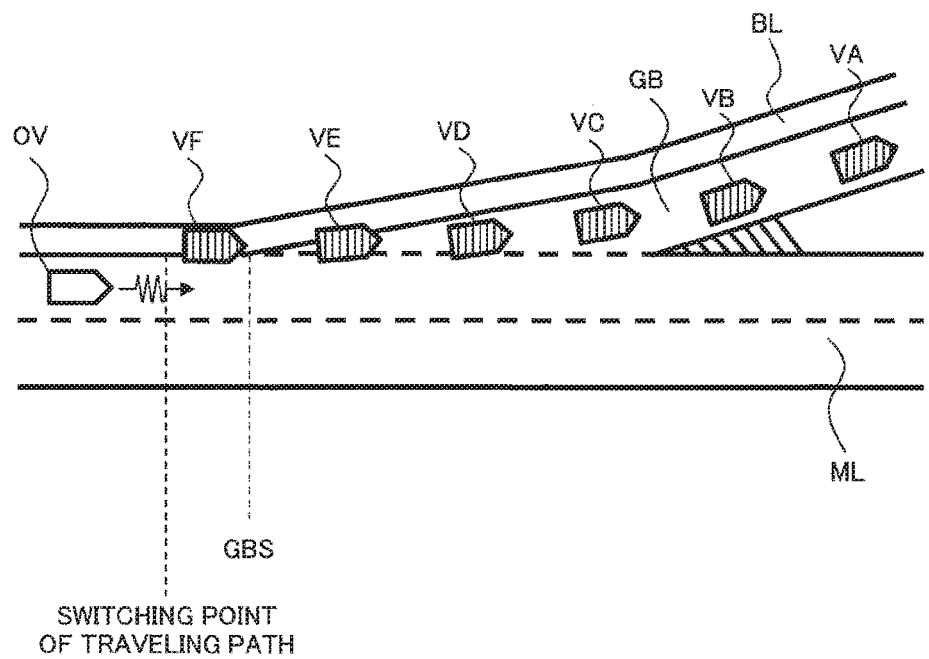
FIG. 5 is a diagram for describing a problem when the traffic jam occurs on the divergent lane extends to a main lane.

In particular, this problem is noticeable when the traffic jam on the divergent lane GB extends to the main lane ML. When the traffic jam extends to the main lane, there comes up the surrounding vehicles which wait for its branch operation in a breakdown lane BL of the main lane ML. FIG. 5 is a diagram for describing this problem. In the example shown in FIG. 5, the surrounding vehicles VA to VE are drawn on the divergent lane GB and a surrounding vehicle VF which waits for its branch operation is drawn on a breakdown lane BL.

As described above, the absence confirmation of the surrounding vehicle interfering with the divergent event is executed on the main lane ML or the divergent lane GB. Therefore, in this case, the surrounding vehicle VF will be out of the scope of the absence confirmation. Therefore, in this case, even if the subject vehicle OV decelerates by recognizing the surrounding vehicle (e.g., the surrounding vehicle VE) on the divergent lane GB, since the traffic jam extends to the main lane, it is difficult for the subject vehicle OV which is controlled in the automatic driving mode to go off the main lane to cut in a space between the surrounding vehicles.

Figure 6:
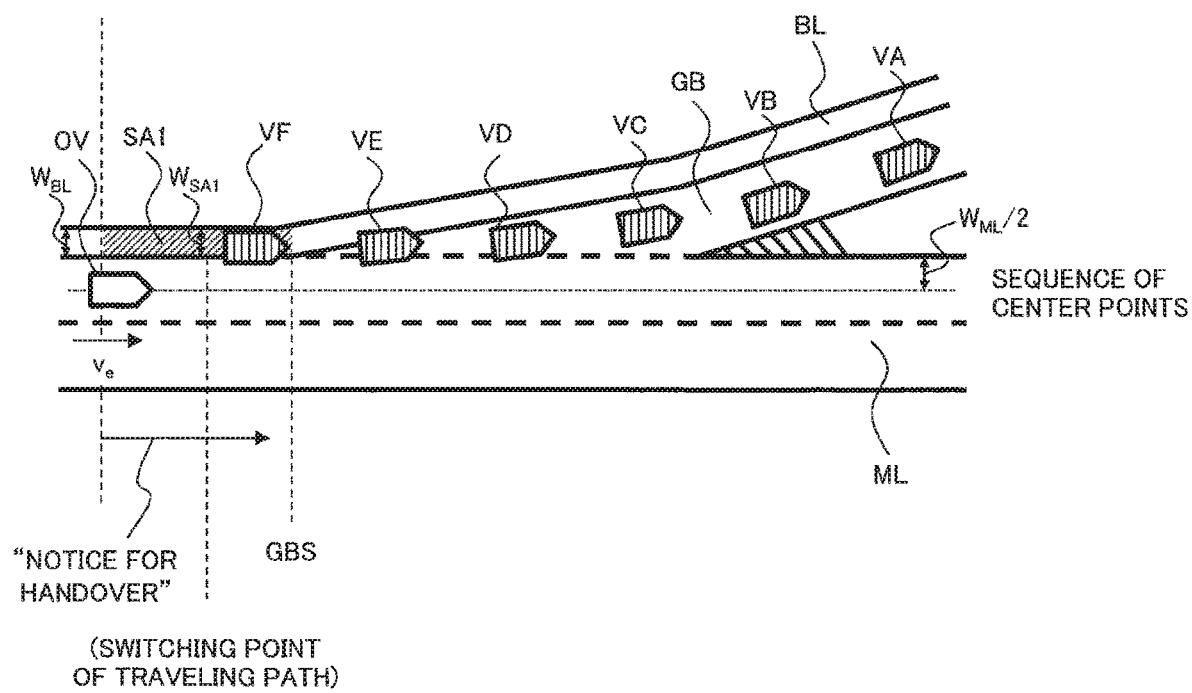
FIGS. 6 to 8 are diagrams for describing features of vehicle control according to the first embodiment.
Figure 7:
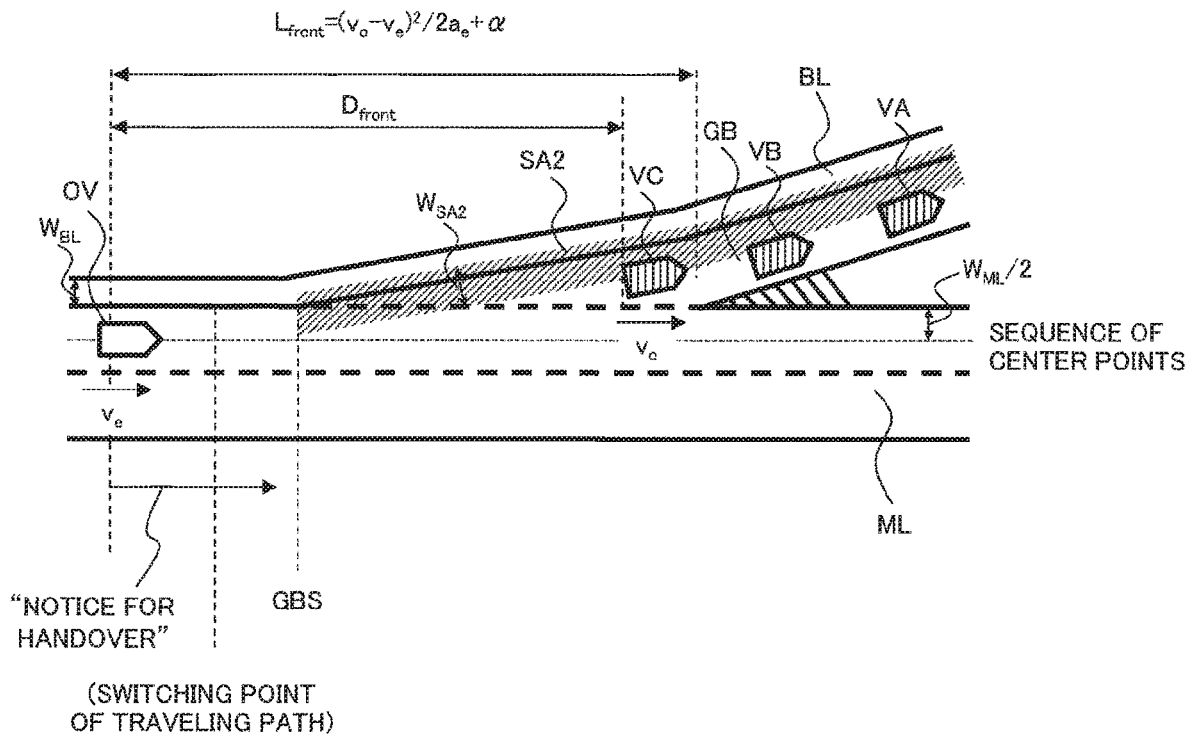
Figure 8:
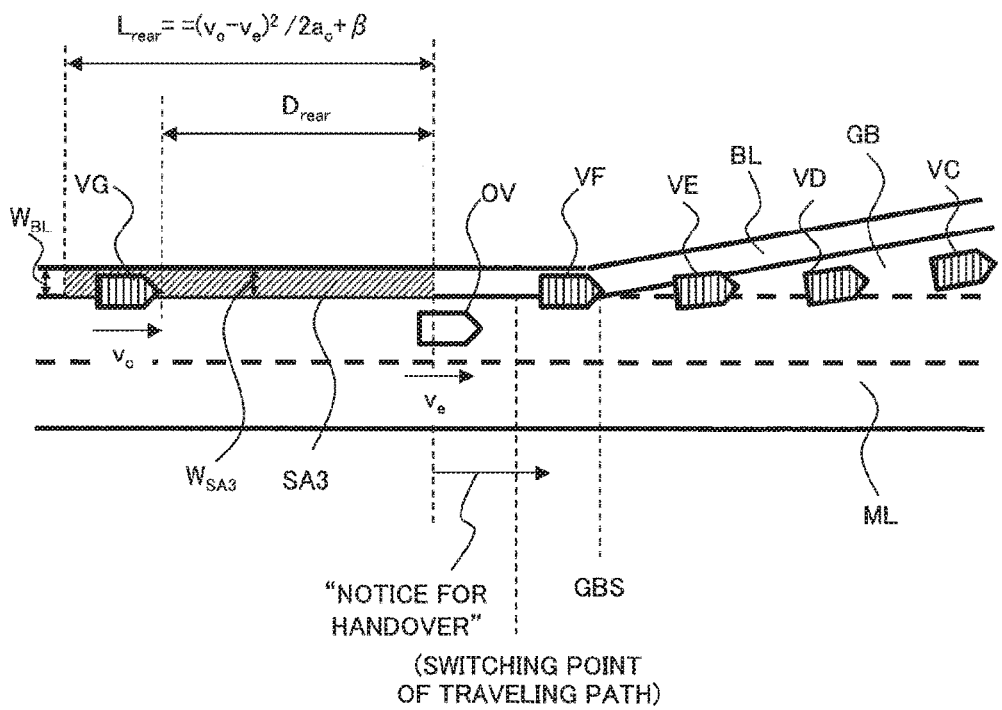

In view of such the problem, in the first embodiment, when generating the traveling path for divergent event in the portion 108, a judgement of the occurrence of the traffic jam on the divergent lane GB is executed. FIGS. 6 and 7 are diagrams for describing features of vehicle control according to the first embodiment. In the first embodiment, based on the recognition result by the portion 104, it is judged whether a surrounding vehicle exist in a search region SA1 shown in FIG. 6, a search region SA2 shown in FIG. 7, or a search region SA3 shown in FIG. 8. Further, when it is judged that the surrounding vehicle exists in the search region SA2 or SA3, it is additionally judged whether the judged surrounding vehicle satisfies predetermined inter-vehicular distance condition.

The search region SA1 shown in FIG. 6 is a region in the breakdown lane BL from the reference position of the subject vehicle OV to the beginning of divergent lane BGS. A width $W_{SA1}$ of the search region SA1 is set equal to a width $W_{BL}$ of the breakdown lane BL, for example. For the width $W_{BL}$, data in the map information data is used.

The search region SA2 shown in FIG. 7 is a region which extends from the beginning of divergent lane BGS along the divergent lane GB. The search region SA2 includes a part of the breakdown lane BL of the divergent lane GB. The reason for this is that when there is the traffic jam on divergent lane GB, the surrounding vehicle waiting for the divergent operation may wait on the breakdown lane BL near the beginning of divergent lane BGS. A width $W_{SA2}$ of the search region SA2 is set equal to, for example, a half of a width $W_{ML}$ of the main lane ML. For the width $W_{ML}$, data in the map information data is used. The inter-vehicular distance condition in the search region SA2 is assumed that a distance $D_{front}$ between the subject vehicle OV and the surrounding vehicles (e.g., a distance along sequence of the center points of the traveling lane) is less than a threshold $L_{front}$. The threshold $L_{front}$ is expressed by following formula (1) using velocity $v_e$ of the subject vehicle OV, speed $v_o$ of the surrounding vehicle existing in the search region SA2, maximum deceleration $a_c$ of the subject vehicle OV, and a margin α.

$$L_{front}=(v_o-v_e)^2/2a_c+\alpha \quad (1)$$

The search region SA3 shown in FIG. 9 is a region of the breakdown lane BL of the traveling lane in back of the reference position of the subject vehicle OV. A width WSA3 of the search region SA3 is set equal to, for example, the width $W_{BL}$ of the breakdown lane BL. The inter-vehicular distance condition in the search region SA3 is assumed to be that a distance $D_{rear}$ between the subject vehicle OV and the surrounding vehicles (e.g., a distance along sequence of the center points of the traveling lane) is less than a threshold $L_{rear}$. The threshold L is expressed by following formula (2) using velocity $v_e$, speed $v_o$ of the surrounding vehicle existing in search region SA3, maximum deceleration $a_0$ of the same surrounding vehicle, and a margin β.

$$L_{rear}=(v_o-v_e)^2/2a_0+\beta \quad (2)$$

In the example shown in FIG. 6, the surrounding vehicle VF exists in the search region SA1. In the example shown in FIG. 7, the surrounding vehicles VA, VB and VC are exist in the divergent lane GB. However, only the surrounding vehicle VC existing in the search region SA2 (in this figure, the surrounding vehicle at an end of a vehicle convoy) is recognized as the surrounding vehicle which satisfies the inter-vehicular distance condition. In the example shown in FIG. 8, the surrounding vehicle VG existing in the search region SA3 is recognized as the surrounding vehicle which satisfies the inter-vehicular distance condition. When the existence of such surrounding vehicle VC, VF or VG is confirmed, it is judged that the traffic jam is occurring on divergent lane GB and a notice for handover from the automatic divergent operation to the manual divergent operation is given to the driver. The notice for handover is executed, for example, by displaying on the MFD or the predetermined area of the touch panel display in accordance with a notification instruction from the portion 108 to the portion 114.

4. Effect by Features of Vehicle Control in First Embodiment

As described above, in the vehicle control according to the first embodiment, the confirmation on the occurrence of the traffic jam on the divergent lane is executed by setting the search regions SA1, SA2 and SA3 and judging whether the surrounding vehicle on the search regions satisfies the predetermined inter-vehicular distance. Further, in the vehicle control according to the first embodiment, the notice for handover is executed when it is confirmed that the traffic jam occurs on the divergent lane. Therefore, even when it is difficult to execute the automatic divergent operation safely due to the occurrence of the traffic jam, it is possible to request for the handover to the driver before switching to the traveling path for divergent event. Therefore, it is possible to execute safely the divergent operation of the subject vehicle OV.

In particular, when the traffic jam of which a tail end extends to the breakdown lane is occurring, it is desirable for the subject vehicle OV, upon the recognition of the surrounding vehicles waiting for each divergent operation on the breakdown lane, to go to the tail end of to cut in a space between the surrounding vehicles. In this regard, according to the vehicle control of the first embodiment, it is possible to recognize in an early-stage the traffic jam through the confirmation and request to the driver for the handover. Then, when the driver manipulates the subject vehicle OV in response to the request for the handover, it is possible to go into the divergent line and complete its divergent operation certainly.

5. Specific Processing

FIG. 9 is a flowchart for describing an example of a program executed by the vehicle control ECU 10 in the first embodiment. It is assumed that the routine shown in FIG. 9 is executed when the action plan consisting of the lane keep event in the main lane in front of the divergent point, the divergent event near the divergent point and the lane keep event in the divergent lane in back of the divergent point.

In the routine shown in FIG. 9, firstly, processing based on the traveling path for lane keep event is executed (step S1). The processing of the step S1 corresponds to various controls of the control objects based on the traveling path for lane keep event in the main lane. Subsequently, it is judged whether the subject vehicle OV passes a point 120 meters before the beginning of the divergent lane (step S2). Note that the length 120 meters is an example, and this length is changeable according to recognizable distance of a front monitoring sensor such as the millimeter wave radar and the camera. If the determination result of the step S2 is negative, the processing of the steps S1 and S2 are continuously executed.

If the determination result of the step S2 is positive, processing to judge whether the traffic jam occurs on the divergent lane (step S3). The judgment processing is executed by using the existence condition in the search region SA1, SA2 or SA3 and the inter-vehicular distance condition in the search region SA2 or SA3 described in FIGS. 6 to 8. If the determination result of the step S3 is positive, the notice for handover is executed (step S4).

If the determination result of the step S3 is negative, processing based on the traveling path for divergent event is executed (step S5). The processing of the step S5 corresponds to various controls of the control objects based on the traveling path for divergent event. Subsequently, it is judged whether the subject vehicle OV has traveled half of the total length of the divergent lane from the beginning of the divergent lane (step S6). If the determination result of the step S6 is negative, the processing of the steps S5 and S6 are continuously executed.

When the determination result of the step S6 is negative, processing based on the traveling path for lane keep event is executed (step S7). The control in the step S7 corresponds to various controls of the control objects based on traveling path for lane keep event in the divergent lane.

6. Correspondence Relationship

In the first embodiment, the vehicle control ECU corresponds to the "controller" of the first aspect. The search region SA2 corresponds to the "first region" of the first aspect. The search regions SA1 and SA3 correspond to the "second region" of the first aspect. The traveling path for lane keep event in the main lane corresponds to the "traveling path for main lane" of the first aspect. The traveling path for divergent event corresponds to the "traveling path for divergent operation" of the first aspect.

Second Embodiment

A second embodiment of the present disclosure will be described with reference to FIGS. 10 and 11. The description of the contents overlapping with the first embodiment will be omitted as appropriate.

1. Features of Vehicle Control in Second Embodiment

In the vehicle control according to the first embodiment, when it is judged that the traffic jam is occurring on the divergent lane GB, the driver is requested to handover. However, it is assumed that the driver does not respond to this request. Therefore, in the second embodiment, during the execution of the notice for handover, switching to traveling path for divergent event is temporarily canceled the current traveling path (i.e., the traveling path for lane keep event in the main lane) is inherited. Furthermore, if there is no response from the driver before the subject vehicle OV passes a predetermined position on the main lane, the current traveling path is taken over thereafter. The predetermined position is set at the beginning of divergent lane. However, the predetermined position may be set to a position in front or back of the beginning of divergent lane.

Figure 10:
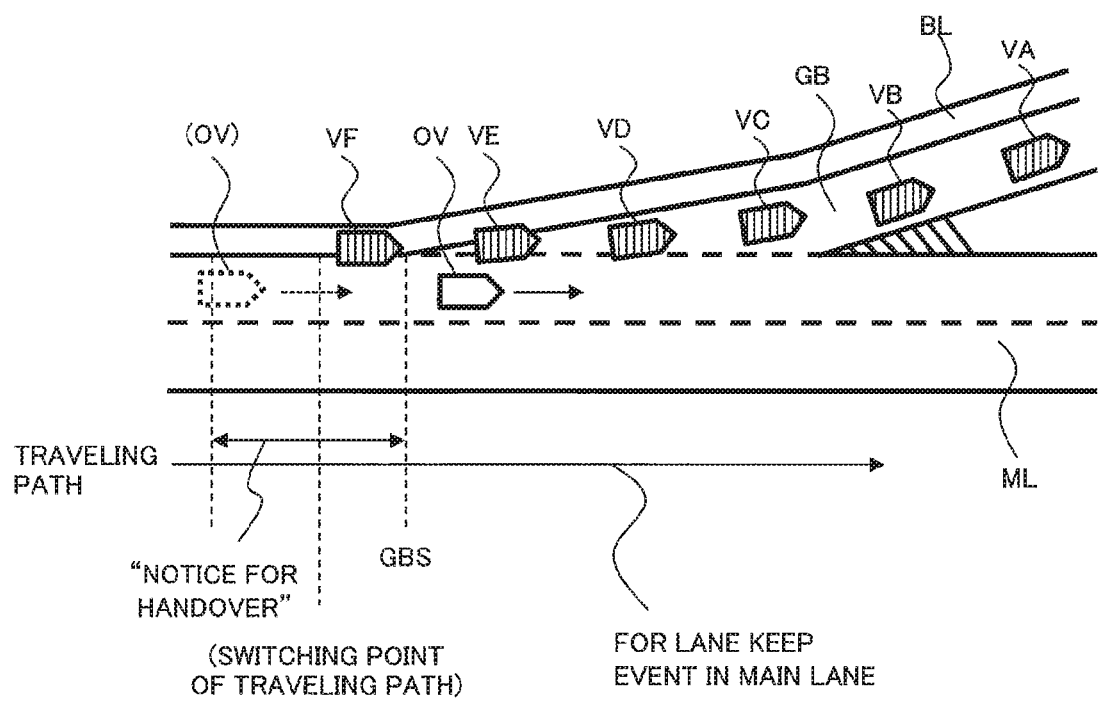
FIG. 10 is a diagram for describing features of vehicle control according to a second embodiment of the present disclosure.

FIG. 10 is a diagram for describing features of vehicle control according to the second embodiment. The position of the subject vehicle OV indicated by a broken line in FIG. 10 corresponds to the subject vehicle OV shown in FIG. 6. As shown in FIG. 10, in the second embodiment, the notice for handover is given to the driver before switching to traveling path for divergent event. The notice for handover is executed until the subject vehicle OV passes the beginning of divergent lane BGS. In the example shown in FIG. 10, it is assumed that there is no response from the driver during execution of this notice for handover. As a result, after passing the beginning of divergent lane BGS, the subject vehicle OV continues to travel along the main lane ML based on the traveling path for lane keep event in the main lane.

2. Effect by Features of Vehicle Control in Second Embodiment

As described above, in the vehicle control according to the second embodiment, during the execution of the notice for handover, the current traveling path is taken over while canceling the switching to the traveling path for divergent event. Therefore, even if driver could not respond to the notice for handover, it is possible for the subject vehicle OV to travel along the main lane based on the traveling path for lane keep event in the main lane. Therefore, even when it is difficult to execute the automatic divergent operation safely, it is possible to keep traveling along the main lane while avoiding the subject vehicle OV stopping near the divergent point.

3. Specific Processing

Figure 11:
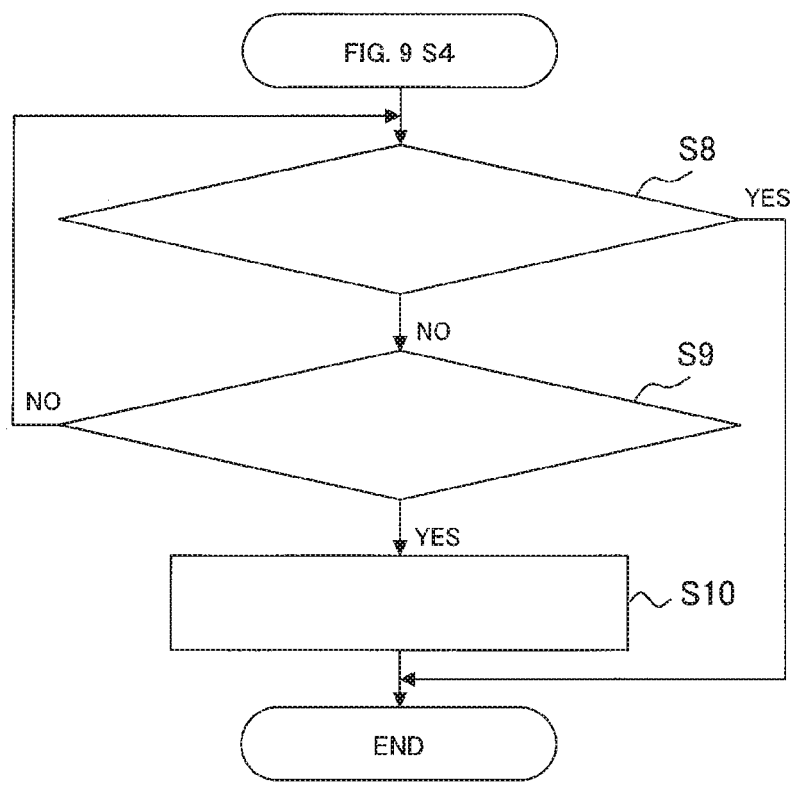
FIG. 11 is a flowchart for illustrating an example of a program executed by the vehicle control ECU in the second embodiment.

FIG. 11 is a flowchart for describing an example of a program executed by the vehicle control ECU 10 in the second embodiment. The routine shown in FIG. 11 is executed after the processing of the step S4 shown in FIG. 9.

In the routine shown in FIG. 11, firstly, it is judged whether the handover of the divergent operation has been completed (step S8). The judgement processing is executed using the information from the operation detection sensor 24. For example, when the operation amount by the driver in the information exceeds a threshold, it is judged that the handover has been completed. If the determination result of the step S8 is positive, the processing of this routine is finished.

If the determination result of the step S8 is negative, it is determined whether the subject vehicle OV has passed the beginning of the divergent lane (step S9). The judgement processing is executed using, for example, the information on actual location of the subject vehicle OV from the GPS device 20. When the judgement result of the step S9 is negative, the processing of the step S8 is executed again.

If the determination result of the step S9 is positive, processing based on the traveling path for lane keep event is executed (step S10). The processing of the step S10 corresponds to various controls of the control objects based on the traveling path for lane keep event in the main lane.

What is claimed is:

1. A vehicle control system comprising a controller which is configured to:
recognize an actual location of a subject vehicle;
recognize a surrounding landmark of the subject vehicle;
generate an action plan of a predetermined route along which an automatic driving is executed;
generate a traveling path based on the action plan, the actual location and the surrounding landmark, wherein the traveling path is a collection of target positions to which the subject vehicle should arrive in future; and
control, based on the traveling path at least a driving force for a travel output device, a steering device, and a brake device of the subject vehicle;
wherein, when an automatic divergent operation between a main lane and a divergent lane is executed, the controller is further configured to:
before switching a current traveling path for the main lane to the traveling path for the divergent lane, judge whether a traffic jam occurs on a first or a second region, wherein the first region is a region which includes a first breakdown lane around the divergent lane and the second region is a region which includes a second breakdown lane around the main lane to which the first breakdown lane connects;
when it is judged that the traffic jam occurs on the first or second region, give a notice, to a driver of the subject vehicle, for handover from the automatic divergent operation to a manual divergent operation.

2. The vehicle control system according to claim 1, wherein the controller is further configured to:

judge whether there is a response from the driver against the notice for handover; and when it is judged that there is no response against the notice for handover, continue to execute the automatic driving based on the current traveling path for the main lane instead of executing the automatic divergent operation based on the traveling path for the divergent lane.

3. The vehicle control system according to claim 1, wherein the controller is further configured to:

judge that the traffic jam occurs on the first region when there is a vehicle on the first region which travels along a same travel direction as the subject vehicle; and judge that the traffic jam occurs on the second region when there is a vehicle on the second region which travels along the same travel direction as the subject vehicle and also a predetermined inter-vehicular distance condition of the vehicle on the second region is satisfied.

* * * * *